G. R. KREBS & J. W. MORGAN.
COMPUTING SCALE.
APPLICATION FILED OCT. 5, 1914.
1,148,099.
Patented July 27, 1915.
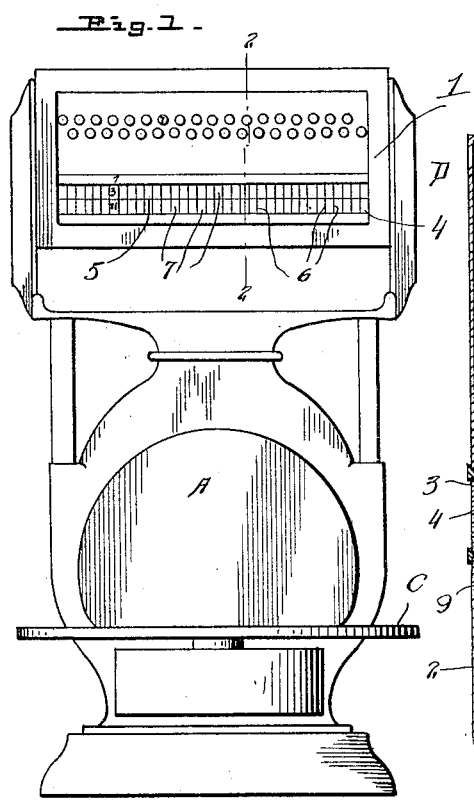
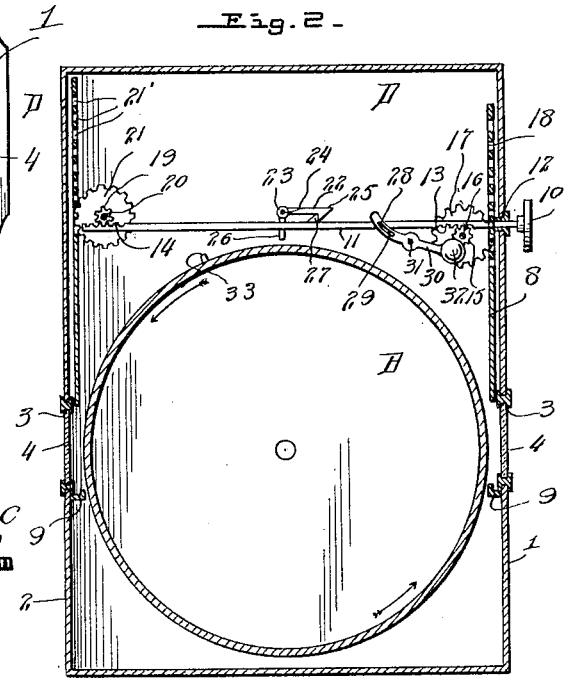
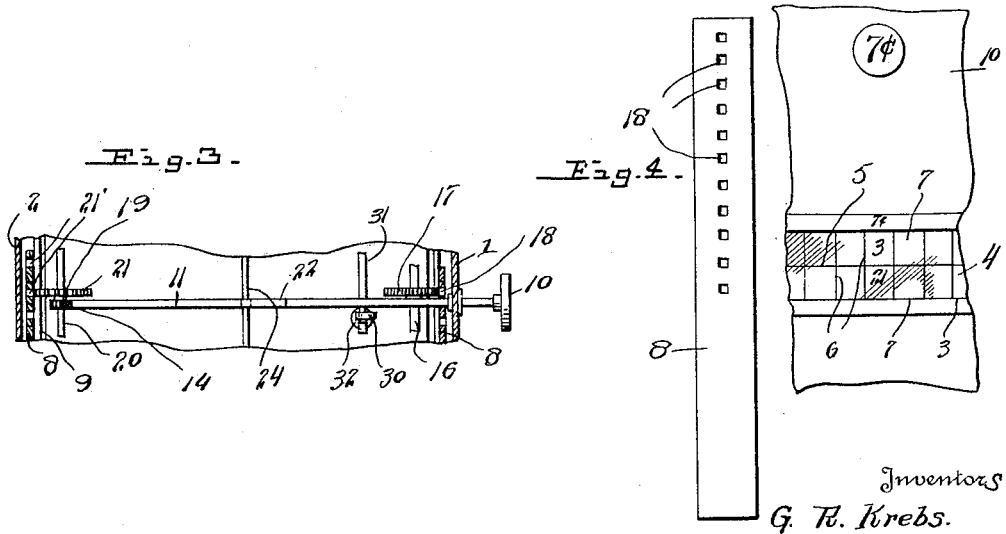
Witnesses
C. E. Kumpf
R. B. Cavanagh
Inventors
G. R. Krebs.
J. W. Morgan.
By 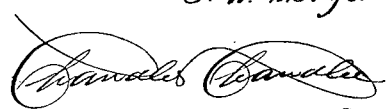
Attorneys

UNITED STATES PATENT OFFICE.

GEORGE R. KREBS AND JAMES W. MORGAN, OF CHARLESTON, WEST VIRGINIA, ASSIGNORS OF ONE-THIRD TO PATRICK T. BOARD, OF CHARLESTON, WEST VIRGINIA.

COMPUTING-SCALE.

1,148,099.  Specification of Letters Patent.  Patented July 27, 1915.

Application filed October 5, 1914. Serial No. 865,158.

*To all whom it may concern:*

Be it known that we, GEORGE R. KREBS and JAMES W. MORGAN, citizens of the United States, residing at Charleston, in the county of Kanawha, State of West Virginia, have invented certain new and useful Improvements in Computing-Scales; and we do hereby declare the following to be a full, clear, and exact description of the invention, such as will enable others skilled in the art to which it appertains to make and use the same.

This invention relates to certain novel and useful improvements in computing scales of that type wherein a revolving cylindrical dial is employed, such for instance as is illustrated in the patent to S. R. Monson, Serial No. 665,922, and dated January 15, 1901.

In carrying out our invention it is our purpose to provide a computing scale of this character wherein the figures on the dial indicative of the weight and value of the article will be exposed to the view of the customer as well as to the merchant, during the weighing operation.

Still a further object of our invention is the provision of a scale of this type wherein, during the weighing operation, all figures on the dial will be concealed from view, except those specific figures which designate the weight and value of an article being weighed at the time, certain mechanism being brought into operation to expose the specific figures applicable to the article upon the scale platform or pan.

Still a further object of our invention is the provision of a weighing scale wherein provision is made for concealing all but the figures applicable to the article being weighed, so that the liability of error in reading wrong figures is eliminated, and a saving of time is accomplished by the ability of both the merchant and the purchaser to tell at a glance the weight and value of the article without examining a multiplicity of figures on the scale to select the figures desired.

A further object of the invention is the provision of a weighing scale of this character which will embody the desired features of accuracy, simplicity, efficiency and reliability, and which may be manufactured and marketed at a relatively low cost.

With the above recited objects and others of a similar nature in view, our invention consists in the construction, combination and arrangement of parts set forth in and falling within the scope of the appended claims.

In the accompanying drawings: Figure 1 is a view in front elevation of a conventional form of cylinder scale having our invention applied thereto. Fig. 2 is a vertical transverse sectional view taken through the dial casing of the scale on the line 2—2 of Fig. 1. Fig. 3 is a top plan view of the operating mechanism illustrated in Fig. 2. Fig. 4 is a detail view in elevation of one of the shutters and showing the row of apertures forming a rack. Fig. 5 is an enlarged detail view of a portion of the front wall of the casing showing the openings therein.

Before entering into a detailed description of the structure of the invention, we will briefly state that we employ in conjunction with the ordinary rotating cylinder dial of the scale, a casing having in opposite sides thereof openings through which the figures or characters on the scale may be exposed. Furthermore, the figures on the cylinder dial are duplicated, that is to say identical figures are arranged at diametrically opposite points on the surface of the cylinder so that the same figure will be simultaneously exposed at the openings at opposite sides, or at the front and rear of the casing, so that the dial may be read at either one side or the other. Thus, if the merchant is standing in front of the scale, the figure or character exposed to his view will be likewise exposed to the view of the customer standing at the rear of the scale. In my improved scale, the openings through which the figures or characters on the cylindrical dial are exposed, are provided with shutters which are normally closed. Operating mechanism is provided for the shutters so that when it is desired to expose certain figures on the dial, the shutter covering said figures may be elevated to expose the latter to inspection. Mechanism is further provided for returning a shutter to closed position when the article being weighed has been lifted from the scale.

Referring now to the accompanying drawings in detail, the letter A designates conventionally any well known form of computing scale having a rotating cylinder dial, indicated by the letter B.

The letter C designates the scale platform upon which the articles to be weighed may be placed, while D designates the casing for the dial. The casing D is preferably rectangular in form, and is provided with the vertical front and rear walls 1 and 2. Each wall is provided with a longitudinal slot 3, covered with a plate 4 of glass or other transparent material, divided centrally and longitudinally by the hair line 5. Each of the transparent or glass covered plates may be further divided by a series of vertical lines 6 so that each plate is divided into two rows of small block-like spaces 7, through which the figures on the dial are exposed to view in the manner readily understood.

By reference to the drawings, and especially to Figs. 1 and 2, it will be seen that each set or pair of blocks formed by a block of the upper row and a block of the lower row immediately beneath, has working in conjunction therewith a small vertically sliding shutter 8. The lower edge of this shutter is adapted to rest upon a ledge or flange 9 when the shutter is in its lowered or closed position, and by reference to Fig. 2, it will be seen that this flange 9 extends longitudinally of each side wall of the casing directly below the slot or opening 3 in the wall of the casing.

When the article to be weighed and computed as to value is placed upon the scale platform C, the cylinder dial B rotates, as is usual in scales of this type, to bring into registry with the openings 3 in the front and rear walls of the casing D those figures on the cylinder dial which correspond to the weight and value of the article. When the cylinder is so rotated and the desired or particular figures or characters thereon have been brought into registry with a pair of the blocks 7 at the front and rear walls of the casing, it is desired that the shutter controlling these particular pairs of blocks 7 should be elevated so that the figures on the dial may be exposed to the view of both the merchant and the customer, this elevation of the shutters is accomplished as follows: The numeral 10 designates a push button bearing thereon a numeral or figure indicative of the rate or price per pound, and as will be seen by reference to Fig. 1, there is one push button for each shutter. As the push buttons and their relative mechanisms are all similar in construction and operation, a description of one will suffice. Each push button 10 has attached to one end a shaft 11 which projects through a bore 12 in the wall 1 of the casing, this shaft 11 extending transversely of the casing and over the top of the cylinder B. This shaft adjacent the push button end thereof is provided on its underside with a rack 13, while the opposite end of the shaft is provided at its upper edge with a similar rack 14. The rack section 13 of the shaft engages with a toothed pinion 15 loosely mounted upon a shaft 16 extending longitudinally of the casing, and this pinion 15 is formed integral with a gear wheel 17, the teeth of which are adapted to mesh with a row of spaced openings 18 in the shutter to reciprocate the shutter after the well known manner of the rack and pinion. Likewise the rack section 14 at the opposite end of the shaft 11 meshes with a pinion 14 loose on the shaft 20 extending longitudinally of the casing adjacent the wall 2, but formed integral with the gear wheel 21 meshing with a row of openings 21' formed in the shutter adjacent the wall 2. Now, it will be evident that if the button 10, indicated in Fig. 2, were pushed inward to the position shown in Fig. 3, the rack sections 13 and 14 of the shaft 11, engaging with their respective pinions, will rotate the gear wheels fast with these pinions, and elevate the shutter to expose the figures of the cylinder dial which have been brought into registry with the block spaces 7 controlled by the shutter.

In order to hold each shutter in its elevated or open position, we provide for each shaft 11 an angular latch 22 pivoted as at 23 upon a shaft 24 extending longitudinally through the casing, the horizontal arm of the latch being provided with a head 25, while the vertical arm 26 of the latch depends to a point adjacent the top of the dial cylinder B. Carried by the shaft 11 is a lug 27, which, as the shaft is pushed inward when the push button is operated, will strike against the head 25 of the latch 22, tilting the latter upward and permitting the lug to ride to a position behind the head of the latch, so that the retractive movement of the shaft 11 is prevented and the shutters will consequently be held in their elevated position. Each shaft 11 is further provided with a pin 28 riding in the segmental slot 29 in the curved arm 30, which arm is loosely mounted about midway its length upon the shaft 31 extending longitudinally of the casing, this arm carrying at its lower end a weight 32. Now, as the push button is pressed to move the shaft 11 inward, the weight carrying arm will be swung from the substantially vertical position shown in Fig. 2 to the approximately horizontal position shown in Fig. 3, and will be held in such latter position so long as the shaft is locked by the engagement of the lug 27 with the latch 22. In the operation of the scale, the cylindrical dial, when the article to be weighed is placed on the platform, rotates in the direction of the arrows, as usual, and consequently carries the tripping lug 33 away from the vertical arm 26 of the latch. When, however, the weighing operation has been completed and the article is lifted from the platform, the cylinder B returns to its normal position, and the trip lug striking the end of the vertical arm 26 of the latch 22 lifts the head 25 of the latch out of contact with the locking lug 27 on the shaft 11 and permits the weight 32 to swing downward, bringing the arm 30 back to its approximately vertical position, and consequently through the slot-and-pin arrangement forcing the shaft 11 outward back to its normal inoperative position, and at the same time allowing the shutter controlled by this shaft and push button to drop and cover the pair of block spaces previously exposed.

It is to be understood that the cylinder dial may have the usual figures indicating the weight, and the usual figures indicating the value, marked thereon in any preferred manner. For instance, this dial may be marked so that the weight in pounds and ounces will show at the upper row of spaced blocks 7, while the figures indicating money valuation may show through the lower row of spaced blocks 7. Furthermore, if desired the front face of the longitudinal strips of the glass frame may be marked as at 35 with rows of figures indicating price per pound, so that the price per pound will readily be seen by the customer, the rate per pound appearing above the proper spaces of the glass.

The faces of the shutters and the available space above the glass plate may be, if desired, utilized for advertisements, price lists, and the like.

Furthermore, in connection with our device, it will be noted that the shutters and the operating mechanism therefor, are actuated without the employment of springs, and other mechanical arrangements which would be liable to be easily injured or deranged.

While we have herein shown and described one particular embodiment of our invention, we wish it to be understood that we do not confine ourselves to all the precise details of construction herein set forth by way of illustration, as modification and variation may be made without departing from the spirit of the invention or exceeding the scope of the appended claims.

What we claim is:

1. In a computing scale, including a rotating cylinder dial, the combination of a casing for said dial, said casing having an opening therein through which the usual figures on the dial are adapted to be exposed during the weighing operation, a shutter for closing said opening, means adapted to be actuated to move the shutter for uncovering the opening, and means actuated by the rotation of the cylinder dial in one direction for closing the shutter.

2. In a computing scale having a rotating cylinder dial, the combination of a casing for said dial, said casing having openings therein through which the usual figures on the dial are adapted to be exposed during the weighing operation, shutters for closing the openings, means including operating keys adapted to actuate the shutters to move the same to uncover the openings controlled by the shutters, and means actuated by the rotation of the cylinder dial for closing the shutters.

3. In a computing scale having a rotating cylinder dial, the combination of a casing for said dial, said casing having an opening therein through which the usual figures on the dial are adapted to be exposed during the weighing operation, a plurality of shutters adapted to cover said opening, means for operating each shutter to move the same to uncover the portion of the opening covered by such shutter, such means including a shaft projecting through the casing and having a push button at one end, and a gear wheel rotatable by the shaft and engaging with the shutter.

4. In a computing scale having a rotating cylinder dial, the combination of a casing for said dial having an opening therein through which the usual figures on the dial are adapted to be exposed during the weighing operation, a plurality of shutters covering said opening, and means for operating the shutters independently to uncover the portion of the opening covered by the shutter, a latching device for operating each shutter in its open position, and means, including a weighted arm, and a latch tripping member carried by the rotating dial adapted to restore the shutter to its closed position upon the completion of the weighing operation.

In testimony whereof, we affix our signatures in the presence of two witnesses.

GEORGE R. KREBS.
JAMES W. MORGAN.

Witnesses:
L. A. CASCI,
R. E. PAYNE.

Copies of this patent may be obtained for five cents each, by addressing the "Commissioner of Patents, Washington, D. C."